United States Patent Office 3,016,356
Patented Jan. 9, 1962

3,016,356
PREPARATION OF FLEXIBLE ELASTOMERIC CELLULAR POLYURETHANE PRODUCTS
Henry A. Pace, Akron, Ohio, assignor to The Goodyear Tire & Rubber Company, Akron, Ohio, a corporation of Ohio
No Drawing. Filed Dec. 21, 1955, Ser. No. 554,423
6 Claims. (Cl. 260—2.5)

This invention relates broadly to the preparation of flexible elastomeric cellular materials. More particularly, it relates to methods for preparing flexible elastomeric cellular structures formed from liquid reaction mixtures containing tolylene diisocyanate and active-hydrogen-containing polymeric materials and to improved products obtained by the use of these methods.

The production of flexible elastomeric cellular structures from liquid polymeric reaction mixtures containing polyisocyanates is a recent development. The reaction mixtures from which the cellular structures are made contain polymeric materials which are either liquid at room temperature or capable of being melted at rather low temperatures. The polymeric materials contain active-hydrogen atoms which react with isocyanate groups to extend the molecular chains. The polyisocyanate reactant performs a three-fold function in the reaction mixture. It operates to extend the chain length of the polymeric material, to react with the water in the formation of carbon dioxide gas and to cross-link or cure the chain-extended polymeric material. The carbon dioxide that is liberated by the reaction produces a foamed mixture which sets to an elastomeric flexible cellular structure after cure.

By the term "active-hydrogen" used to describe the polymeric material is meant those hydrogen atoms which are reactive as measured and determined by the Zerewitinoff method. Examples of active-hydrogen-containing polymeric materials are polyesters, polyesteramides, and polyalkylene ether glycols.

The polyesters are prepared by the condensation of one or more glycols with one or more dibasic carboxylic acids. Polyesteramides are prepared from one or more glycols, one or more dibasic carboxylic acids and relatively small amounts of one or more bifunctional amino compounds such as amino carboxylic acids, amino alcohols and diamines. Small amounts of trifunctional materials may also be employed in the preparation of the polyesters and polyesteramides. The polyalkylene ether glycols are hydroxyl-terminated polyethers derived from alkylene oxides or glycols or from heterocyclic ethers, such as dioxolane. Further examples of these active-hydrogen-containing materials and methods for their preparation are described in U.S. Patents 2,625,531; 2,625,532; and 2,625,535 which show polyesteramides and polyesters, and U.S. Patents 2,692,873 and 2,702,797 which show polyalkylene ether glycols. Preferred active-hydrogen-containing materials useful in practice of this invention are polyesters and polyesteramides having an average molecular weight of from approximately 750 to 2,250, an acid number not greater than 5, and an hydroxyl number from 50 to 150. Best results are obtained with an active-hydrogen-containing polymeric material, having an acid number not greater than 2, a hydroxyl number of approximately 60, and a corresponding average molecular weight of approximately 1,900. It is also preferred that these polymers be substantially anhydrous and contain not more than 0.2 percent of water by weight.

The amount of polyisocyanate should be sufficient to chain-extend and cross-link the polymeric material and to react with water to form carbon dioxide gas. In general, from 2 to 8 equivalents of isocyanate per mol of active-hydrogen-containing polymeric material may be employed, with best results being obtained by the use of approximately 3 mols of diisocyanate per mol of polymeric material.

Since the reaction mixture is liquid at the time when the carbon dioxide gas is generated to produce the desired cellular structure, control of the generation of the carbon dioxide gas so as to minimize shrinkage and collapse of the cured cellular product is necessary. The polymeric material in the reaction mixture is a viscous liquid which, as the chain extension and cross-linking reactions proceed, progressively become more viscous until finally it forms the solid network for the resilient cellular finished product. If the generation of the carbon dioxide occurs before the polymeric material becomes sufficiently viscous and before it possesses sufficient internal strength, the generated gas will escape from the reaction mixture and shrinkage or collapse of the cured material will result. This shrinkage or collapse results in a product having non-uniform density and a relatively thick skin of non-porous material on the surface. If, on the other hand, the gas is generated late in the course of the reaction, at which time chain-extension and cross-linking is well advanced, the polymeric material has become too tough to be readily expanded or blown, with the result that the late-evolved gas diffuses through the mass and escapes to leave a finished material of low porosity and very high density.

One method for minimizing collapse in the finished structures has been described in my copending application Serial Number 508,323, filed May 13, 1955, now Patent No. 2,879,233, wherein it is disclosed that generation and removal of the initial exothermic heat of reaction by the formation of a prepolymer will aid in the preparation of cellular products having the desired properties. As described in my copending application referred to above, the prepolymer is prepared by reacting an active-hydrogen-containing polymeric material, such as a polyester, a polyesteramide or a hydroxyl terminated polyether, having an average molecular weight of from 750 to 2,250 and an acid number not greater than 5 with from 0.90 to 1.10 mols of a diisocyanate per mol of polymeric material, the reaction proceeding until the exothermic heat of reaction has been generated and removed from the reaction mixture. The benefits obtainable by preparing a prepolymer in the manner described are still further enhanced by the use of the invention herein described.

It is the broad object of this invention to provide a method for controlling the density of flexible elastomeric cellular structures prepared from reaction mixtures comprising an active-hydrogen-containing material, water and diisocyanate. An additional object is to provide a method for varying the density of the cellular material without altering the process of manufacture. Another object is to produce uniform, high quality cellular material from these reaction mixtures. It is also an object to control the generation of carbon dioxide to prevent collapse in foams produced from these reaction mixtures. Still another object is to provide a method for the production of the flexible cellular materials whereby cracks or fissures in the finished material are eliminated. Other objects will appear as the description proceeds.

The objects of this invention are accomplished by utilizing a prepolymer such as described in the aforesaid co-pending application which has been prepared from and/or foamed and cured by means of a diisocyanate mixture containing 2,6-tolylene diisocyanate in addition to 2,4-tolylene diisocyanate. It has been found that the density of the finished product can be varied and cracks or fissures minimized by the use of from 9 to 35% by weight of 2,6-tolylene diisocyanate in combination with from 91 to 65% by weight of 2,4-tolylene diisocyanate, best results being obtained by the use of an 85/15 weight ratio of the 2,4 isomer to the 2,6 isomer. If less than 9% of the 2,6 isomer is used, the foamed material tends to collapse before cure, while if more than 35% of the 2,6 isomer is used, the cured materials have inferior physical properties. To achieve the objects of this invention the ratio of isomers can be employed either in the preparation of the prepolymer or in the foaming and curing operations, with best results being obtained when the isomer ratio is employed in preparing the prepolymer as well as in the foaming and curing reaction.

The practice of this invention is further illustrated with respect to the following examples in which, unless otherwise specified, parts are shown by weight. These examples are representative rather than restrictive of the scope of this invention.

EXAMPLE 1

A polyester was prepared by the condensation reaction of 1 mol of adipic acid with approximately ⅓ mol ethylene glycol, ⅓ mol diethylene glycol and ⅓ mol of butylene glycol. This polyester had a hydroxyl number of 60 and an acid number of 2. The polyester (700 parts) was mixed with 14 parts of castor oil and 71.4 parts of a mixture of tolylene diisocyanates containing approximately 9% by weight of the 2,6 isomer and approximately 91% by weight of the 2,4 isomer. This reaction mixture was stirred in a closed flask at a water bath temperature of 60° C. for approximately 35 minutes during which time the reaction temperature rose gradually to approximately 65° C. after 13 minutes, and subsequently fell off to 63° C. after 35 minutes. The prepolymer resulting from this reaction was cooled to room temperature.

This prepolymer (100 grams) was mixed with 22.4 grams of the same mixture of tolylene diisocyanates, 2.75 parts of water, 0.5 cubic centimeters of N-methylmorpholine and 0.64 parts of the condensation product of approximately 4 mols of butyraldehyde and 1 mol of aniline. The complete reaction mixture was thoroughly mixed and poured into a mold where the foaming of the reaction mixture was completed. The foamed material was cured for approximately 20 minutes at 60° C. followed by 1 hour at 100° C.

EXAMPLE 2

The same procedure was followed as for Example 1 except a mixture of tolylene diisocyanates containing approximately 20% by weight of the 2,6 isomer and approximately 80% by weight of the 2,4 isomer was employed.

EXAMPLE 3

The same procedure was followed as for Example 1 except a mixture of tolylene diisocyanates containing approximately 31% by weight of the 2,6 isomer and approximately 69% by weight of the 2,4 isomer was employed.

EXAMPLE 4

The same procedure was followed as for Example 1 except a mixture of tolylene diisocyanates containing approximately 44% by weight of the 2,6 isomer and approximately 56% by weight of the 2,4 isomer was employed.

All of the samples prepared according to Examples 1 through 4 were of excellent quality with no cracks or fissures and with no evidence of shrinkage or collapse. Physical tests were determined for each of the cured samples produced according to Examples 1 through 4. The results of these physical tests are shown in Table I below in which density is represented in pounds per cubic foot, tensile strength in pounds per square inch, elongation in percent at break, and compression in pounds. The compression values are determined by measuring the pounds required to compress 50 square inches of the cellular material to 75% of its original thickness. The method for conducting this test is described on page 2 of the Rubber Manufacturer's Association Specification for Latex, dated April 1, 1953. The value T/D is the ratio of tensile strength to density.

Table I

| Example | Density | Tensile | Elongation | Compression | T/D |
| --- | --- | --- | --- | --- | --- |
| 1 | 2.9 | 38 | 611 | 59 | 12.7 |
| 2 | 3.5 | 39 | 559 | 65 | 11.1 |
| 3 | 4.7 | 38 | 363 | 72 | 8.2 |
| 4 | 7.0 | 41 | 221 | 115 | 5.8 |

The density results shown in Table I indicate that by varying only the amount of the 2,6 isomer content in the tolylene diisocyanate mixture it is possible to change the density values as much as 4 pounds per cubic foot at these relatively low density levels. Since the ultimate use of the cellular product determines the desired density and compression values, it is possible for the manufacturer to fix the density and/or compression in the finished material by merely adjusting the 2,6 isomer level to a predetermined amount.

While certain representative embodiments and details have been shown for the purpose of illustrating the invention, it will be apparent to those skilled in this art that various changes and modifications may be made therein without departing from the spirit or scope of the invention.

I claim:

1. In the process of preparing a flexible elastomeric cellular material from the reaction of an organic diisocyanate, water, and an active-hydrogen-containing polymeric material containing not more than 0.2% water by weight and being selected from the group consisting of polyesters, polyesteramides and polyalkylene ether glycols having an average molecular weight of from 750 to 2,250 and a hydroxyl number of from 50 to 150, said polyesters and polyesteramides having an acid number not greater than 5 said polyesters being prepared from the condensation of at least one dicarboxylic acid and at least one glycol, said polyesteramides being prepared from the condensation reaction of at least one dicarboxylic acid, at least one glycol and a bifunctional amino compound selected from the group consisting of amino carboxylic acids, amino alcohols and diamines, which process includes the steps of first forming a liquid prepolymer by reacting said polymeric material with from 0.9 to 1.10 mols of an organic diisocyanate per mol of said polymeric material until the exothermic heat of reaction has been substantially evolved and removed from the reaction mixture, and then adding additional organic diisocyanate and water to said liquid prepolymer, and curing the complete reaction mixture, the improvement which comprises employing in at least one of the diisocyanate reactions a mixture of tolylene diisocyanates containing from 9 to 35% by weight of the 2,6 isomer and from 91 to 65% by weight of the 2,4 isomer.

2. The process of preparing a flexible elastomeric cellular material which comprises forming a liquid prepolymer by reacting (A) an active-hydrogen-containing polymeric material containing not more than 0.2% water by weight and being selected from the group consisting of polyesters, polyesteramides and polyalkylene ether glycols having an average molecular weight of from 750 to 2,250 and a hydroxyl number of from 50 to 150, said polyesters and polyesteramides having an acid number not greater than 5 said polyesters being prepared from the condensation of at least one dicarboxylic acid and at least one glycol, said polyesteramides being prepared from the condensation reaction of at least one dicarboxylic acid, at least one glycol and a bifunctional amino compound selected from the group consisting of amino carboxylic acids, amino alcohols and diamines with (B)

from 0.90 to 1.10 mols of tolylene diisocyanate per mol of said polymeric material, the tolylene diisocyanate containing from 9 to 35% by weight of the 2,6 isomer and from 91 to 65% by weight of the 2,4 isomer, said reaction continuing until the exothermic heat of reaction has been substantially evolved and removed from the reaction mixture, adding additional organic diisocyanate and water to said liquid prepolymer and curing the complete reaction mixture.

3. The process of preparing a flexible elastomeric cellular material which comprises preparing a liquid prepolymer by reacting (A) an active-hydrogen-containing polymeric material containing not more than 0.2% water by weight and being selected from the group consisting of polyesters, polyesteramides and polyalkylene ether glycols having an average molecular weight of from 750 to 2,250 and a hydroxyl number of from 50 to 150, said polyesters and polyesteramides having an acid number not greater than 5 said polyesters being prepared from the condensation of at least one dicarboxylic acid and at least one glycol, said polyesteramides being prepared from the condensation reaction of at least one dicarboxylic acid, at least one glycol and a bifunctional amino compound selected from the group consisting of amino carboxylic acids, amino alcohols and diamines with (B) from 0.9 to 1.10 mols of an organic diisocyanate per mol of said polymeric material until the exothermic heat of reaction has been substantially evolved and removed from the reaction mixture, adding water and a mixture of tolylene diisocyanate to said liquid prepolymer, said mixture of tolylene diisocyanates containing approximately 85% by weight of the 2,4 isomer and approximately 15% by weight of the 2,6 isomer and curing the complete reaction mixture.

4. In the process of preparing a flexible elastomeric cellular material as defined by claim 1, the improvement which comprises conducting at least one of the diisocyanate reactions in the presence of a mixture of tolylene diisocyanates containing approximately 85% by weight of the 2,4 isomer and approximately 15% by weight of the 2,6 isomer.

5. The process defined by claim 2 in which the mixture of tolylene diisocyanates contains approximately 85% by weight of the 2,4 isomer and approximately 15% by weight of the 2,6 isomer.

6. In the process of preparing a flexible elastomeric cellular material from the reaction of an organic diisocyanate, water, and a polyester containing not more than 0.2% water by weight and prepared from the condensation of at least one dicarboxylic acid and at least one glycol and having an average molecular weight of approximately 2,000 and an acid number not greater than 2, which process includes the steps of first forming a liquid prepolymer by reacting said polyester with from 0.9 to 1.10 mols of an organic diisocyanate per mol of said polyester until the exothermic heat of reaction has been substantially evolved and removed from the reaction mixture and then adding additional organic diisocyanate and water to said liquid prepolymer and curing the complete reaction mixture, the improvement which comprises employing a mixture of approximately 85% by weight of 2,4-tolylene diisocyanate and approximately 15% by weight of 2,6-tolylene diisocyanate for both of the diisocyanate reactions.

References Cited in the file of this patent

UNITED STATES PATENTS

| | | |
|---|---|---|
| 2,625,531 | Seeger | Jan. 13, 1953 |
| 2,888,411 | Pace | May 26, 1959 |
| 2,911,379 | Parker et al. | Nov. 3, 1959 |
| 2,970,118 | Wilson et al. | Jan. 31, 1961 |

OTHER REFERENCES

White: "The Journal of the Society of Dyers and Colourists," volume 70, No. 11, November, 1954, pages 481 to 486.

Hopkins: "Rubber Age," 78, No. 2, November, 1955, pages 239–248.

De Bell et al.: "German Plastics Practice," copyright 1946, published by De Bell & Richardson, Springfield, Mass., pages 301, 463–64.